(12) United States Patent
Franck

(10) Patent No.: US 8,333,043 B2
(45) Date of Patent: Dec. 18, 2012

(54) APPARATUS FOR THERMALLY HYGROMETRICALLY PROCESSING AIR, PARTICULARLY FOR CLASSIFIED ENVIRONMENTS FOR FOOD PREPARING PROCESSES

(75) Inventor: Adam Franck, Sesto San Giovanni (IT)

(73) Assignee: Sinteco Impianti S.R.L., Sesto San Giovanni (MI) (IT)

(*) Notice: Subject to any disclaimer, the term of this patent is extended or adjusted under 35 U.S.C. 154(b) by 158 days.

(21) Appl. No.: 12/798,188

(22) Filed: Mar. 31, 2010

(65) Prior Publication Data
US 2010/0269946 A1   Oct. 28, 2010

(30) Foreign Application Priority Data
Apr. 23, 2009   (IT) ............................... MI2009A0690

(51) Int. Cl.
*E04B 1/70*       (2006.01)
*E04F 17/00*      (2006.01)
(52) U.S. Cl. ..................................................... 52/302.1
(58) Field of Classification Search ................ 52/302.1, 52/302.3, 309.9, 406.1, 408, 783.1, 794.1; 62/78; 312/400, 406, 409
See application file for complete search history.

(56) References Cited

U.S. PATENT DOCUMENTS

| | | | | |
|---|---|---|---|---|
| 1,743,879 | A | * | 1/1930 | Canavan ............................ 52/27 |
| 2,571,253 | A | * | 10/1951 | Keleher ........................... 62/239 |
| 3,183,683 | A | * | 5/1965 | Reiter et al. ..................... 62/411 |
| 3,729,889 | A | * | 5/1973 | Baruzzini ........................ 52/264 |
| 3,904,524 | A | * | 9/1975 | Pelton et al. .................... 210/94 |
| 4,361,613 | A | * | 11/1982 | Bogner et al. ................. 428/119 |
| 5,027,615 | A | * | 7/1991 | Wakatsuki et al. ............. 62/419 |
| 5,090,175 | A | * | 2/1992 | Arfert et al. ................. 52/309.11 |
| 5,174,640 | A | * | 12/1992 | Kuwahara et al. ............. 312/407 |
| 5,954,087 | A | * | 9/1999 | Wolf et al. ..................... 137/312 |
| 6,096,416 | A | * | 8/2000 | Altenberg ................... 428/317.7 |
| 6,256,945 | B1 | * | 7/2001 | Yates et al. ....................... 52/177 |
| 7,216,464 | B2 | * | 5/2007 | Neal et al. ..................... 52/584.1 |
| 2008/0028775 | A1 | * | 2/2008 | Ausseil et al. .................... 62/91 |

* cited by examiner

*Primary Examiner* — Joshua J Michener
*Assistant Examiner* — Keith Minter
(74) *Attorney, Agent, or Firm* — Hedman & Costigan, P.C.; James V. Costigan

(57) ABSTRACT

An apparatus for thermally hygrometrically processing and conditioning air for classified environments and preparing foods. The apparatus has a stainless steel inner bottom and monolithic thermally insulated panels. The panels have an outer wall and an inner wall therebetween a thermally insulating material is arranged.

19 Claims, 3 Drawing Sheets

APPARATUS FOR THERMALLY HYGROMETRICALLY PROCESSING AIR, PARTICULARLY FOR CLASSIFIED ENVIRONMENTS FOR FOOD PREPARING PROCESSES

BACKGROUND OF THE INVENTION

The present invention relates to an apparatus for thermally hygrometrically processing air, particularly for classified environments and food preparing processes in general.

More specifically, the apparatus according to the present invention has been designed for application in all the food article industry fields such as meat, dairy, child and so on food articles, and also in other fields such as pharmaceutical, hospital, chemical, microelectronic, civil and nuclear applications.

SUMMARY OF THE INVENTION

The aim of the present invention is to provide an apparatus of the above mentioned type which can be perfectly sanitized and washed.

Within the scope of the above mentioned aim, a main object of the invention is to provide such an apparatus which allows to achieve highly hygienic characteristics, while eliminating any contaminations from dirt deposits, thereby providing a highly clean processed air.

Another object of the present invention is to provide such an apparatus allowing to continuously control the processed air quality.

Another object of the present invention is to provide such an apparatus which may be quickly and easily washed as required.

Yet another object of the present invention is to provide such an apparatus construction, which, owing to its specifically designed features, is very reliable and safe in operation.

According to one aspect of the present invention, the above mentioned aim and objects, as well as yet other objects, which will become more apparent hereinafter, are achieved by an apparatus for thermally hygrometrically processing and conditioning air for classified environments and preparing foods, characterized in that said apparatus comprises a stainless steel inner bottom and monolithic thermally insulated panels, said panels comprising an outer wall and an inner wall therebetween a thermally insulating material is arranged.

Advantageously, said thermally insulated panel walls are glass fiber reinforced plastics walls therebetween a high density polyurethane material is arranged.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example in the accompanying drawings, where.

DESCRIPTION OF THE PREFERRED EMBODIMENTS

Figure 1:
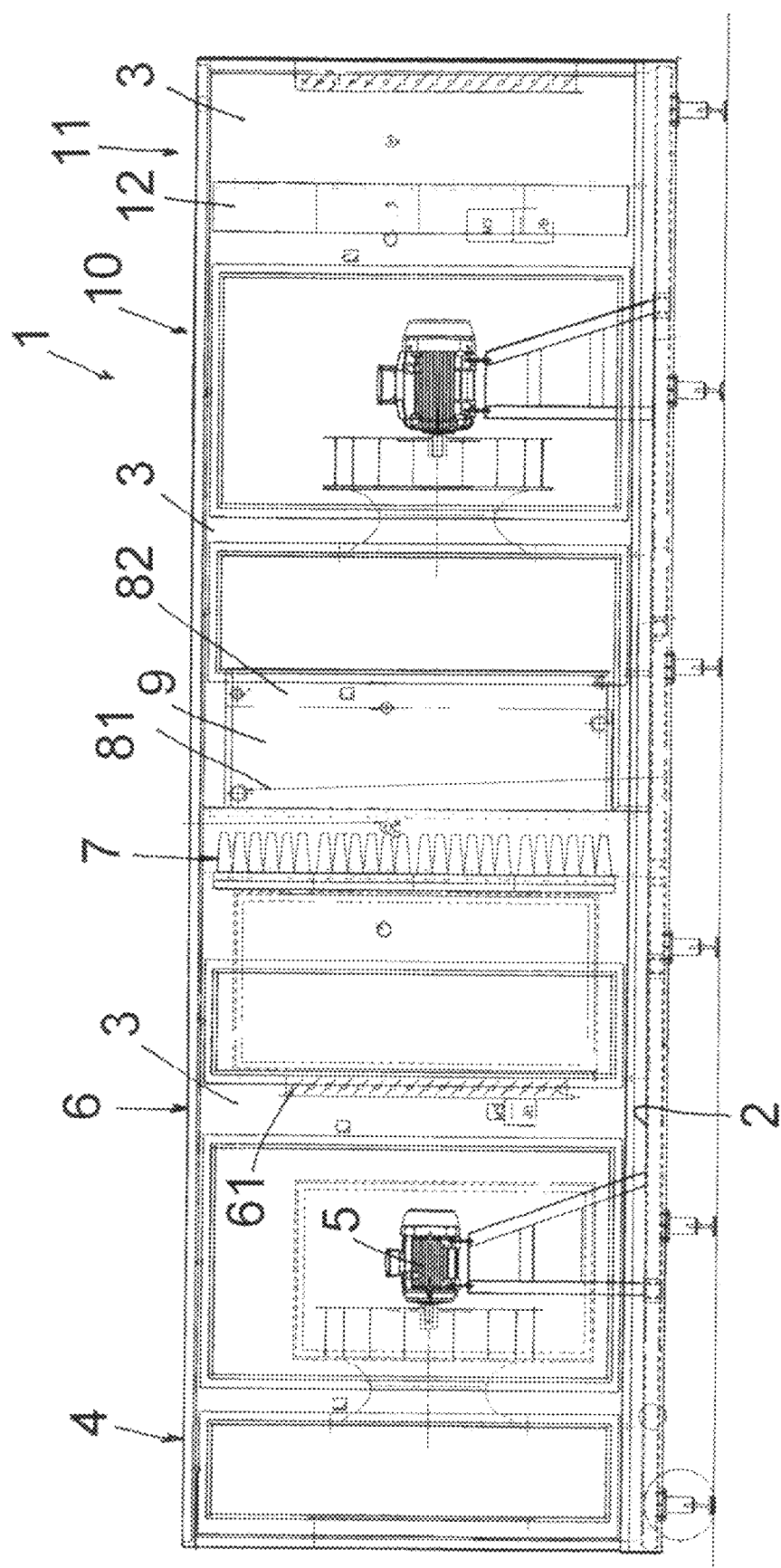
FIG. 1 is a side elevation view, as longitudinally cross-sectioned, of the apparatus according to the present invention.
Figure 2:
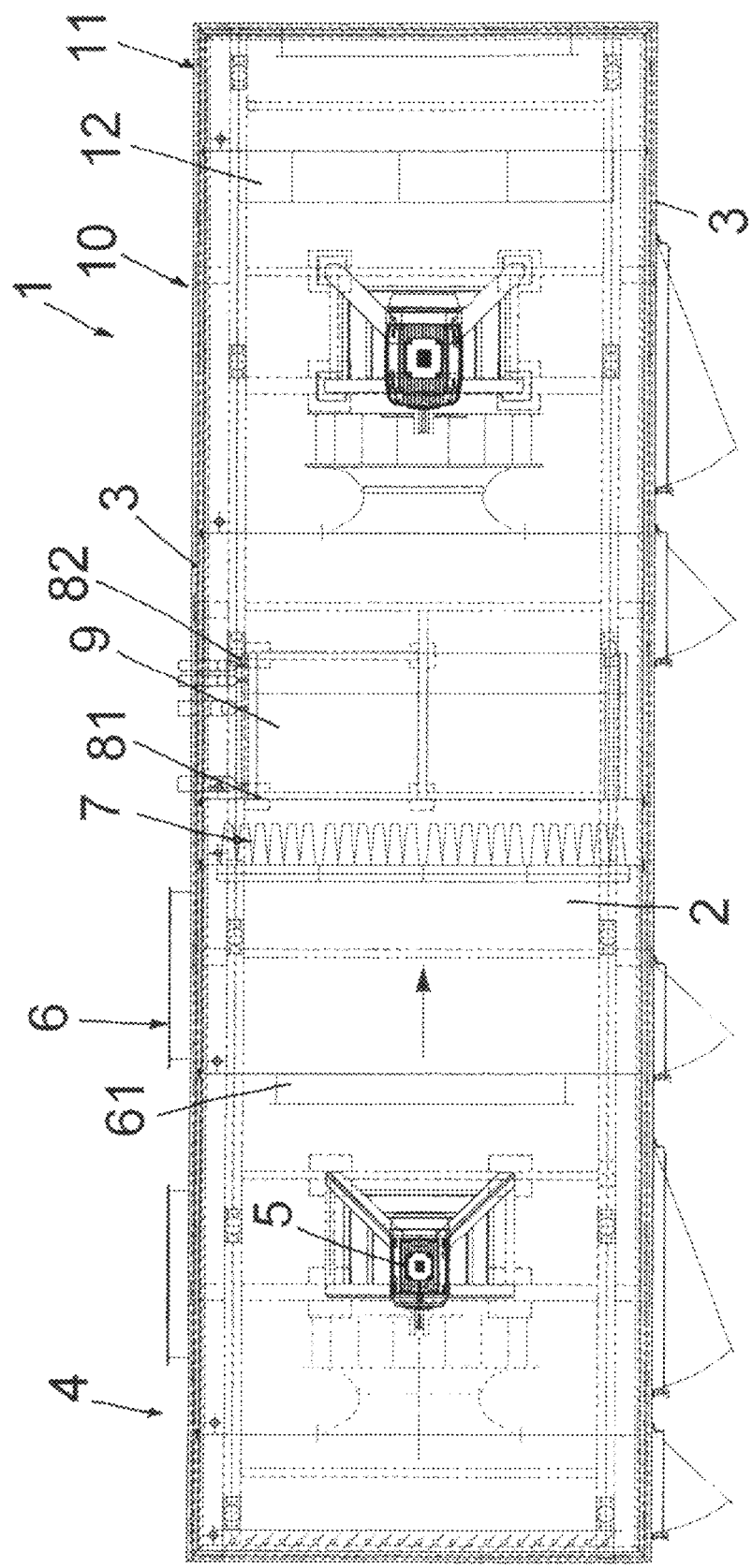
FIG. 2 is a top plan view of the apparatus according to the present invention.
Figure 3:
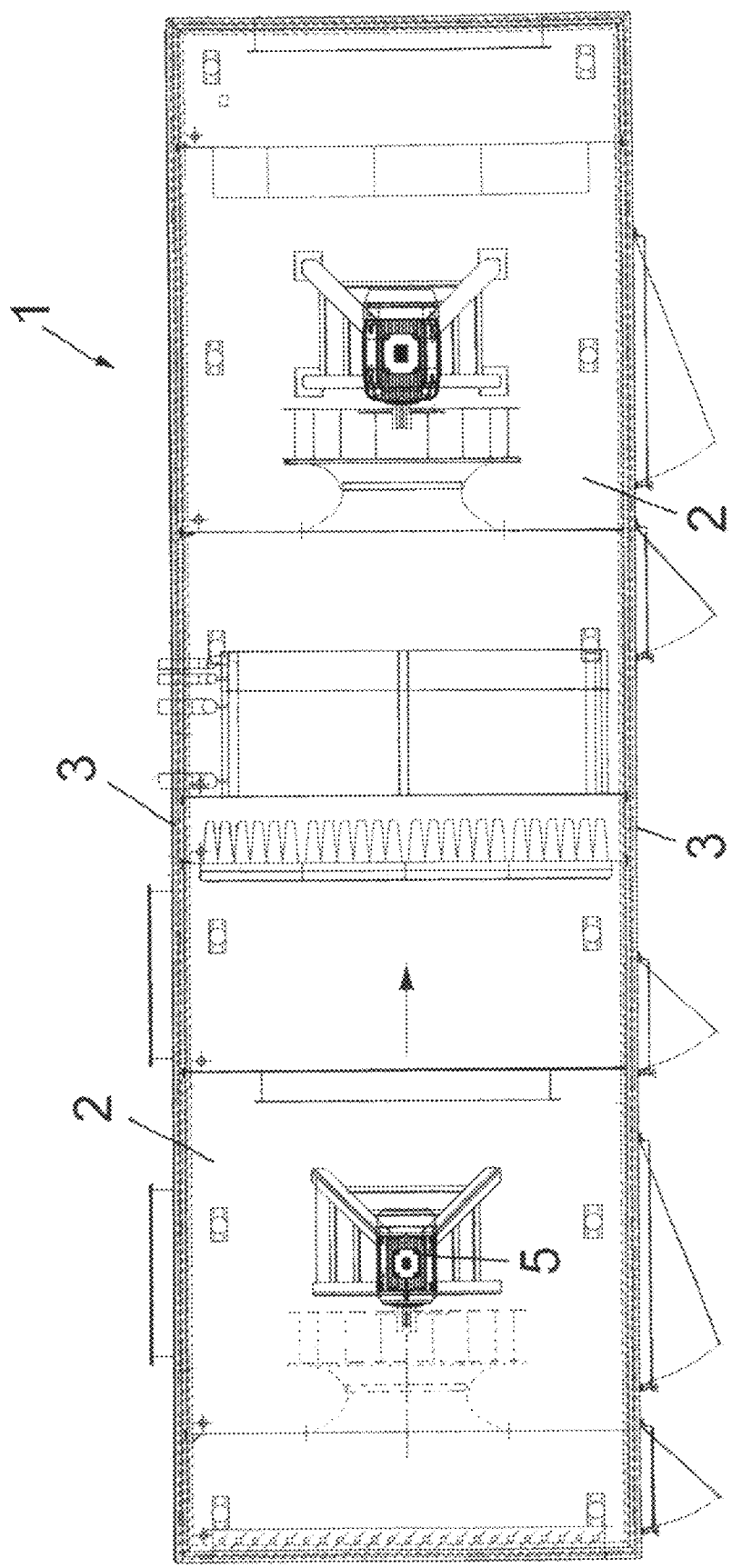
FIG. 3 is yet another top plan view of the apparatus according to the present invention.

With reference to the number references of the above mentioned figures, the apparatus according to the present invention, which has been generally indicated by the reference number 1, comprises an inner bottom 2, made of a reinforced TIG welded stainless steel material, and a plurality of monolithic polyester panels 3 arranged on the two apparatus sides, with a thermally insulating material arranged therebetween, such as a high density polyurethane material, or any other materials of like characteristics, and having a variable thickness depending on requirements.

More specifically, the stainless steel material used for making the inner bottom is preferably an Aisi 304 stainless steel material.

The inner bottom is advantageously a single-block bottom, and has a fully sealed construction including, built-in therein, all the other walls and a tight coupling means, thereby providing a monolithic apparatus.

The inner bottom further comprises radiused inner edges to facilitate washing operations of said inner bottom.

The apparatus also comprises a plurality of modular apparatus sections, designed based on the apparatus size and inner components, each said apparatus section supporting respective components of said apparatus.

The inner sections of the apparatus are formed by reinforced diaphragm elements including separating sheet metal elements, preferably made either of a galvanized or a differently processed stainless steel material, all said separating sheet metal elements also operating to stiffen said apparatus.

According to the present invention, the apparatus is made by coupling two different material types that is said stainless steel bottom 2 and thermally insulated polyester panel walls 3, thereby providing a very strong apparatus construction, which may be deeply sanitized at a low cost.

The type and number of the apparatus modules will depend on the use of said apparatus, and comprises at least the following basic modules:

a recovery air and outer air suction section 4, optionally including a free cooling fan 5;

an air mixing section 6;

a filtering section 7 including discrete filters selected depending on a required filtering degree;

a cold 81 and a hot 82 battery section;

a spacer section 9 spacing the cold battery 81 from the hot battery 82;

an air delivery ventilating section 10; and a further air delivery section 11.

Between the ventilating 10 and air delivery section 11 it is possible to provide a further absolute filtering section 12.

The apparatus may also comprise other built-in optional structures, depending on the characteristics required by the user and the apparatus application.

The apparatus, for example, may comprise the following auxiliary apparatus sections:

a suction fan section;

an ejecting section;

an outer air suction section;

a chemical dehumidification section including a wheel member;

a heat recovery section;

an active carbon filtering section; and a humidification section.

The arrangement, type and number of said sections being selected based on technical characteristics and features of the apparatus.

According to a further main feature of the present invention, the bottom of the apparatus, which has a tight construction, comprises a plurality of water drains built-in in said bottom and properly arranged in each apparatus section.

Each said section comprises moreover an independent drain for facilitating a water outflow while preventing stagnations which would represent a bacteric growth and pollution source.

The bottom of the apparatus is generally flat.

Said apparatus further comprises a plurality of adjustable foot elements allowing said apparatus to be inclined to a slope sufficient to assure a full outflow of liquid waste materials, such as washing liquids and condensate materials formed during a normal operation of said apparatus.

If desired by the user, also the bottom may be made with a slanted arrangement or construction, either with a single or double slope.

A further main feature of the apparatus according to the present invention is that its thermal insulation is made of a high density polyurethane, including a plurality of large thickness layers selected depending on the apparatus use, to reduce to a minimum possible thermal losses through the apparatus walls, to provide a very high power saving, much larger than that of conventional apparatus.

A lot of different materials may be used for the inner and outer surfaces of the panels, in place of the mentioned fiberglass reinforced material.

For example, the apparatus walls may be made of a stainless steel material, either galvanized or pre-painted, with several material combinations of the apparatus wall outside and inside portions.

The apparatus may further comprise a perimetrical stainless steel material belt for characterizing the apparatus itself, as a single-block compact structure, of very high stiffness.

For special applications, for example for high temperatures, it would be also possible to provide an intermediate layer made of a thermally insulating material based on a rock wool or other like materials.

While, as stated, the apparatus is constructed as a single block unit, it could be also made of discrete prefabricated modules which could be easily assembled in situ.

The apparatus tightly sealed doors are made of the same materials as that of said panels and without thermal bridges.

All the inner components of the apparatus may be withdrawn and fixed to the apparatus base or bottom by fixed means specifically designed to leave the bottom free for allowing a perfect cleaning operation thereof.

The apparatus may easily installed on a floor on adjustable foot elements, or can be suspended on a suspending structure both of a concrete or a metal framework type.

As the machine is installed on a floor, the foot elements may be adjusted to leave a sufficient free space for easily performing cleaning operations thereunder.

All the outward directed tube or cable path arrangements have been specifically designed to prevent dirt materials from depositing at critical apparatus points and from contacting the outside environment.

Advantageously, the control instruments are arranged on the outside of the apparatus construction.

As the apparatus is installed in an outside environment, it will be further provided with a stainless steel roof to protect it from weather agents and sun.

Other advantageous characteristics of the apparatus according to the present invention are a very low operation noise, a full and easy accessibility, also due to the fact that all the inner components of the apparatus may be easily disassembled, and quickly and simply reassembled again, and moreover a long duration useful life.

It has been found that the invention fully achieves the intended aim and objects.

In fact, the invention has provided an apparatus of very good constructional and hygienic and low bacteric load properties, and which is adapted to be subjected both to frequent and occasional washing operations.

In practicing the invention, the used materials, as well as the contingent size and shapes, can be any, depending on requirements.

The invention claimed is:

1. An apparatus to be installed either in an inner or in an outer environment for thermally hygrometrically processing and conditioning air to be supplied to classified environments and to food preparing processes, said apparatus comprising four apparatus sides and an apparatus inner bottom made of a reinforced Tungsten Inert Gas welded stainless steel material, two of said four apparatus sides supporting a plurality of monolithic thermally insulating polyester panels comprising an outer wall and an inner wall with a thermally insulating material arranged there between wherein said apparatus is made as a single block or as a plurality of prefabricated modules adapted to be assembled in situ, for allowing said apparatus to be installed as a single piece apparatus and said modules comprise at least a recovery air and outer air suction section including a free cooling fan;
an air mixing section;
a filtering section including a plurality of discrete filters;
a cold and a hot battery section;
a spacer section spacing the cold battery from the hot battery section;
an air delivery ventilating section; and
a further air delivery section.

2. An apparatus, according to claim 1, characterized in that said thermally insulating material comprises glass fiber reinforced high density polyurethane material.

3. An apparatus, according to claim 1, characterized in that said outer and inner walls are made of a polyester resin walls.

4. An apparatus, according to claim 1, characterized in that said outer and inner walls are of wall materials selected from glass fiber reinforced plastics materials and galvanized or pre-painted stainless steel.

5. An apparatus, according to claim 1, characterized, in that said apparatus further comprises a stainless steel perimetrical outer belt arrangement.

6. An apparatus, according to claim 1, characterized in that said thermally insulating material comprises a rock wool material.

7. An apparatus, according to claim 1, characterized in that said inner bottom includes, built-in therein, two walls forming the other two sides of said apparatus.

8. An apparatus, according to claim 1, characterized in that said inner bottom comprises radiused inner edges to facilitate washing operations of said inner bottom.

9. An apparatus, according to claim 1, characterized in that said apparatus comprises a plurality of modular apparatus sections.

10. An apparatus, according to claim 9, characterized in that said apparatus sections are formed by reinforced diaphragm elements including separating sheet metal elements, made of a either galvanized or otherwise processed stainless steel material, all said separating sheet metal elements also operating to stiffen said apparatus.

11. An apparatus, according to claim 10, characterized in that said inner bottom comprises a plurality of water drains built-in therein and arranged at each said apparatus section.

12. An apparatus, according to claim 10, characterized in that each said apparatus section comprises an independent drain to allow water to be drained and prevent stagnation regions from occurring.

13. An apparatus, according to claim 10, characterized in that said inner bottom has a flat construction and comprises a plurality of adjustable foot elements allowing said apparatus to be inclined to a slope sufficient to assure a full outflow of washing liquids and condensate liquids.

14. An apparatus, according to claim 13, characterized in that said inner bottom comprises either a single or a double slope.

15. An apparatus, according to claim 1, characterized in that said apparatus comprises sealed apparatus doors made of a same material as that of said panels and without thermal bridges.

16. An apparatus, according to claim 1, characterized in that all said inner components of said apparatus can be withdrawn from said apparatus and fixed to the apparatus base by fixing means leaving said inner bottom free, to allow said bottom and an inside of said apparatus to be sanitized and washed.

17. An apparatus, according to claim 1, characterized in that said apparatus comprises a plurality of bearing foot elements for supporting said apparatus on a floor, or a plurality of hanging means to hang said apparatus from civil and metal framework constructions.

18. An apparatus, according to claim 1, characterized in that between the air delivery ventilating section and further air delivery section is positioned a further absolute filtering section.

19. An apparatus to be installed either in an inner or in an outer environment for thermally hygrometrically processing and conditioning air to be supplied to classified environments and to food preparing processes, said apparatus comprising four apparatus sides and an apparatus inner bottom made of a reinforced Tungsten Inert Gas welded stainless steel material, two of said four apparatus sides supporting a plurality of monolithic thermally insulating polyester panels comprising an outer wall and an inner wall with a thermally insulating material arranged there between wherein said apparatus is made as a single block or as a plurality of prefabricated modules adapted to be assembled in situ, for allowing said apparatus to be installed as a single piece apparatus wherein said apparatus further comprises a suction fan section; an ejecting section; an outer air suction section; a chemical dehumidification section; a heat recovery section; an active carbon filtering section; and a humidification section.

\* \* \* \* \*